United States Patent [19]
Fukuda et al.

[11] Patent Number: 4,698,810

[45] Date of Patent: Oct. 6, 1987

[54] DATA RECORDING AND REPRODUCING SYSTEM WITH ERROR CORRECTION CAPABILITY USING ECC AND CRC CODES

[75] Inventors: Yasushi Fukuda; Takafumi Oka; Kazuo Tanaka, all of Odawara, Japan

[73] Assignee: Hitachi, Ltd., Tokyo, Japan

[21] Appl. No.: 643,419

[22] Filed: Aug. 23, 1984

[51] Int. Cl.$^4$ .................. G06F 11/12; H03M 13/22; G11B 5/09

[52] U.S. Cl. ........................ 371/38; 371/39; 369/59; 360/32

[58] Field of Search .................. 371/37–40; 369/59; 360/53, 32

[56] References Cited

U.S. PATENT DOCUMENTS

| | | | |
|---|---|---|---|
| 4,211,997 | 7/1980 | Rudnick et al. | 371/40 X |
| 4,249,253 | 2/1981 | Gentili et al. | 371/38 |
| 4,319,356 | 3/1982 | Kocol et al. | 371/13 |
| 4,371,930 | 2/1983 | Kim | 371/13 X |
| 4,380,071 | 4/1983 | Odake | 371/40 |
| 4,400,810 | 8/1983 | Ive | 371/40 |
| 4,408,326 | 10/1983 | Takeuchi et al. | 371/38 |

Primary Examiner—Raymond F. Cardillo
Assistant Examiner—Alyssa H. Bowler
Attorney, Agent, or Firm—Antonelli, Terry & Wands

[57] ABSTRACT

An optical disk system. Each of data blocks supplied from a higher ranked unit is divided into a plurality of code words, each of which is added with an error correction code to be subsequently recorded on an optical disk. In reproduction, each of the data blocks read out from the optical disk is subjected to error correction on the code-word basis. Information indicative of the presence or absence of data error in each code word and the presence or absence of the error incapable of being corrected is sent to the higher ranked unit together with the reproduced data. In this way, the code word suffering the uncorrectable error is excluded from data of the other code words which can be validly utilized by the high ranked unit.

4 Claims, 9 Drawing Figures

FIG. 5A

| 1 | 2 | 3 | 4 | 5 | 6 | 7 | 516 | 517 | 518 | 519 | 520 | 521 |

FIG. 5B

| 1 | 36 | 71 | 106 | 141 | 176 | 211 | 210 | 245 | 280 | 315 | 350 | 385 |

FIG. 5C

| 1 | 36 | 71 | 106 | 141 | 176 | 211 | 210 | 245 | 280 | 315 | 350 | 385 | CRC 1 | CRC 2 | ECC 59 | ECC 60 |

FIG. 7

DATA RECORDING AND REPRODUCING SYSTEM WITH ERROR CORRECTION CAPABILITY USING ECC AND CRC CODES

BACKGROUND OF THE INVENTION

1. Field of the Invention

The present invention relates generally to a data recording and reproducing system and more particularly to a data recording and reproducing system suited for use in combination with an optical disk system.

2. Description of the Prior Art

As an attempt to implement an apparatus which is capable of recording and reproducing a great amount of information on a single recording surface at an extremely high recording density, active efforts have been made for the development of an optical disk system. The optical disk is generally provided with several millions of tracks in the recording area defined between outer and inner peripheries, wherein each track is divided into a plurality of blocks, which are referred to as sectors and assigned to have inherent addresses, respectively. The recording and reproduction of data are performed on the block or sector basis. In the system which is designed to read the data on a block basis, it is common that the data of each block is recorded together with an ECC (Error Correction Code) so that a data error produced upon reproduction may be corrected by making use of the ECC syndrome.

However, in the hitherto known data recording and reproducing system, such error which has proven to be uncorrectable by an ECC correcting circuit can not be identified as to the location or position within the data block where the uncorrectable error is present. As a consequence, whole data block which contains the error has to be dealt with as the invalid data.

In the optical disk system, information is recorded on a recording film formed on a disk surface in the form of deformation or phase variation of the recording film which is produced through irradiation with a high energy beam generated by a laser. In reproduction, the data or information thus recorded is detected as variations in the intensity of light reflected from the recording surface. In that case, the level of reflected light is easily susceptible to influences, such as variations in the condition of the formed recording film, changes in the irradiation light beam and the like. Such being the circumstance, the probability of error being produced in the data reproduced from the optical disk is at present higher, as compared with the probability of error occurrence in other recording systems, such as a magnetic disk system and the like. Accordingly, it is now an important technical problem to determine how to decrease technically the occurrence of an error in the recorded and reproduced data and, besides, how to correct the produced error to thereby allow the data to be utilized more effectively.

SUMMARY OF THE INVENTION

It is an object of the present invention to provide a data recording and reproducing system in which a data recording medium which is likely to produce a data error, such as an optical disk, is employed and which allows the degree of tolerance or margin for the occurrence of error to be increased.

Another object of the present invention is to provide a data recording and reproducing system in which data is recorded and reproduced on and from a recording medium on a block basis and which can enhance the capability of correcting erroneous data.

A still further object of the present invention is to provide a data recording and reproducing system in which data is recorded and reproduced on and from a recording medium on a block basis and which permits normal parts of data suffering no error to be utilized effectively even in case the uncorrectable error is produced.

In view of the above objects, there is provided according to an aspect of the invention a data recording and reproducing system for recording data supplied from a higher ranked unit on a recording medium on a block basis and for transferring data read from the recording medium to the higher ranked unit on a block basis, wherein, in the data recording operation, each of the data blocks is divided into a plurality of code words each of which has added thereto an error correcting code to be subsequently recorded on the recording medium, while in the reproducing operation, the data of each of the data blocks read out from the recording medium is subjected to error correction on a code-word basis, whereby information indicative of the presence or absence of a data error in each code word is sent to the higher ranked unit together with the corrected data of each block. In this way, even when the uncorrectable error takes place in a part of the code words of each data block, the data of the other code words of that block can be validly utilized.

According to a preferred embodiment of the present invention, the data of the each code word and error correcting code are interleaved in a predetermined sequence to be subsequently recorded on the recording medium. With this arrangement, even when errors should occur concentratedly on a particular location on the recording medium, the data errors will be dispersed among a number of the code words. Accordingly, the probability of this type of error being within the correcting capability of the error correcting circuit is increased.

The above and other related objects, features and advantages of the invention will be apparent from the following description taken in conjunction with the accompanying drawings.

BRIEF DESCRIPTION OF THE DRAWINGS

FIG. 5A is a view for illustrating a data array of one block of data supplied from a CPU;

FIG. 5B is a view for illustrating an interleaved data array;

FIG. 5C is a view for illustrating a data array of one block including a cyclic redundancy check code (CRC) and an error correcting code (ECC) in the state to be recorded on an optical disk;

FIG. 7 is a view showing a matrix for illustrating the relationship between code words and sections as well as error correction according to the present invention.

DESCRIPTION OF THE PREFERRED EMBODIMENTS

Figure 1:
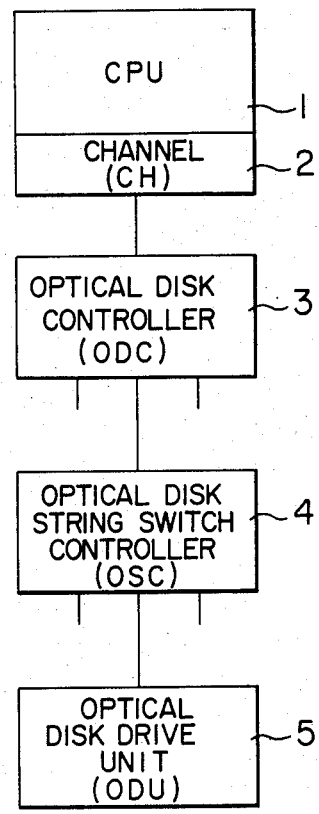
FIG. 1 shows in a block diagram an exemplary arrangement of a data processing system including an optical disk equipment to which the present invention can be applied.

FIG. 1 shows, by way of example, a general arrangement of an optical disk system to which the data recording/reproduction apparatus according to the present invention can be applied. In the figure, a reference numeral 1 denotes a central processing unit or CPU, 2 denotes a channel system or CH, 3 denotes an optical disk controller or ODC, 4 denotes an optical disk string switch controller or OSC, and a numeral 5 denotes an optical disk drive unit or ODU for driving an optical disk (not shown) and positioning an optical head at a predetermined track on the optical disk to allow data to be written in or read from the optical disk. The illustrated optical disk system is arranged in such a way that the single optical disk controller or ODC 3 which receives commands through the channel 2 controls a plurality of the optical disk string switch controllers or OSC 4 in a multiplex manner so that each of the OSCs 4 may perform processing, such as modulation/demodulation (coding/decoding) of data, write/read control and error detection and correction, for a plurality of the optical drive units or ODUs 5.

The optical disk which is placed on the ODU 5 is provided with about four million tracks formed in a spiral pattern between the innermost and the outermost peripheries, wherein a turn of the track is divided into a number of sectors, e.g. 64 sectors, each sector having a leading portion in which address information such as a track address and a sector address as well as a synchronizing signal are previously recorded. Among the 64 sectors constituting the single track, 62 sectors, for example, may be used as user's area while the two remaining sectors are reserved as the alternative sectors, wherein each of the sectors may have a data recording capacity of 521 bytes, for example. Upon recording or reproduction of data, the control processing unit or CPU 1 designates the records in the user's area with the aid of the sector addresses allotted to the individual sectors of the track in the order corresponding to the rotating direction of the optical disk.

Figure 2:
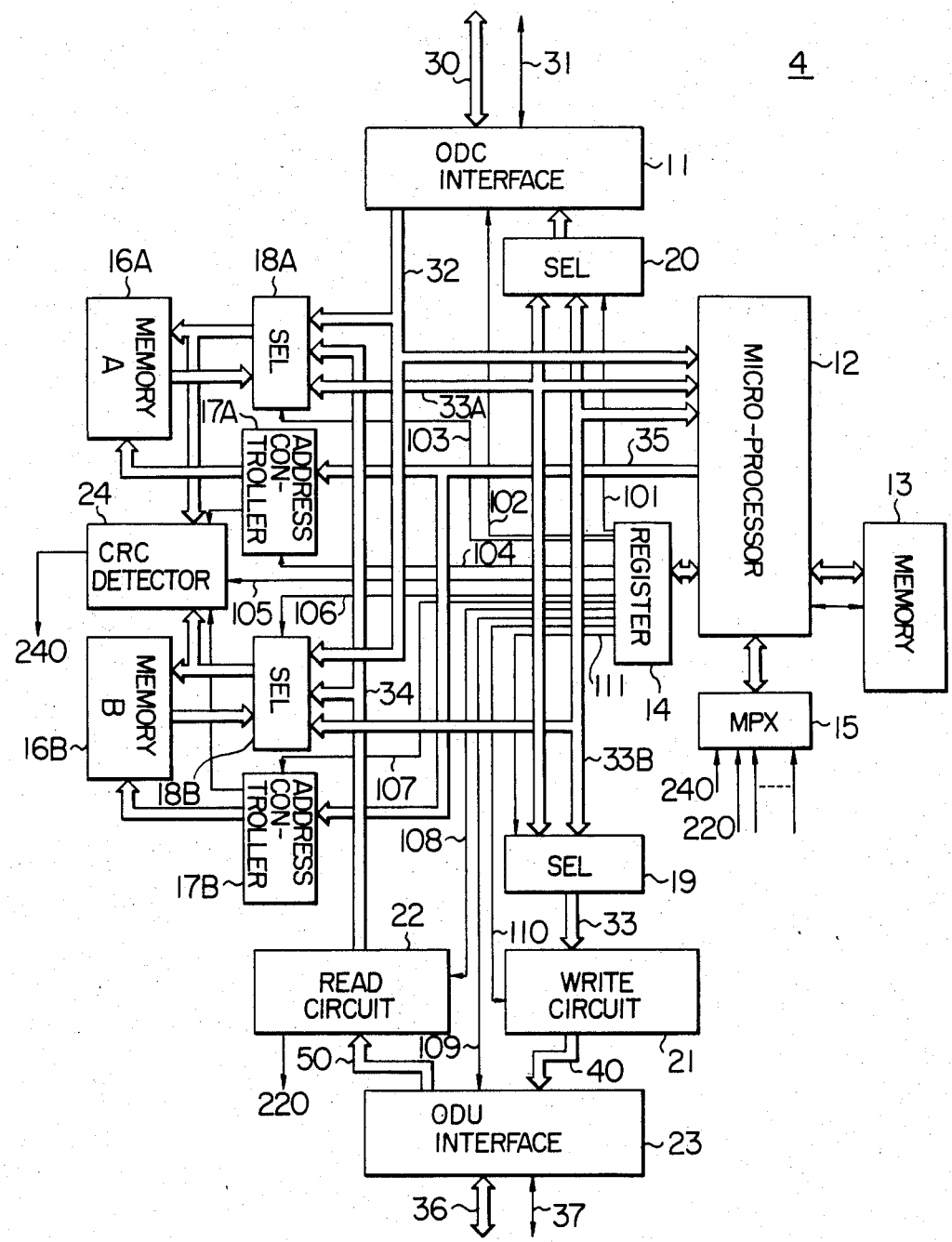
FIG. 2 shows in a block diagram an arrangement of a main part of an optical disk string switch controller or OSC (4) shown in FIG. 1.
Figure 6:
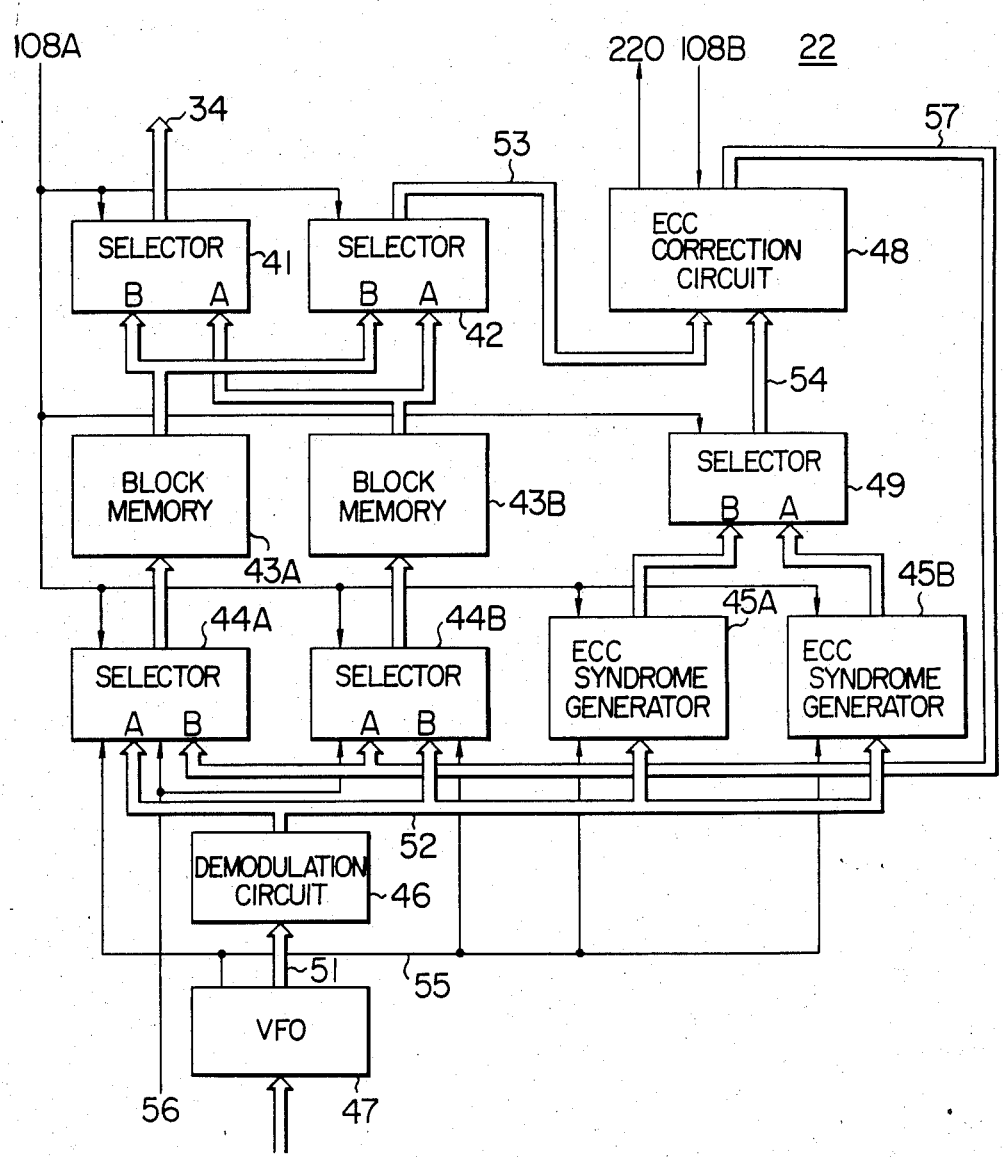
FIG. 6 shows in a block diagram an arrangement of a main part of a read circuit (22) shown in FIG. 2.

FIG. 2 shows in a block diagram an arrangement of the optical disk string switch controller or OSC 4. In the figure, a reference numeral 11 denotes an ODC interface connected to the optical disk controller or ODC 3 by way of a data bus 30 and a control line 31, a numeral 12 denotes a microprocessor for operating the individual circuit components of the OSC 4 through predetermined procedures in response to the commands issued by the ODC 3, a numeral 13 denotes a memory for storing therein a group or set of micro-instructions for specifying the control operations to be performed by the microprocessor 12, a numeral 14 denotes a register for producing control signals 101 to 111 in response to the control commands from the microprocessor 12, symbols 16A and 16B denote, respectively, buffer memories each having a storage capacity corresponding at least to the data of the single track on the optical disk, 17A and 17B denote address controller circuits for determining the addresses of the buffer memories 16A and 16B, respectively, 18A and 18B denote selectors for selecting the input/output buses for the buffer memories 16A and 16B, respectively, and a numeral 19 denotes a selector for selectively connecting either the output bus 33A of the buffer memory 16A or the output bus 33B of the buffer memory 16B to a write circuit 21. The write circuit 21 serves for modulating the data read out from the buffer memory 16A or 16B as selected by the selector 19 on the one hand and for adding a correction code for error check to the data on the other hand, as described hereinafter, wherein the output of the write circuit 21 is supplied to an ODU interface 23. The ODU interface 23 is connected to the optical disk drive unit or ODU 5 by way of a data bus 36 and a control line 37 and serves for supplying the modulated data output from the write circuit 21 to the ODU 5, while supplying the data read out from the optical disk to a read circuit 22. The read circuit 22 demodulates or decodes the output signal from the ODU 5 to allow the error correction to be performed by an error check and correction circuit or ECC circuit 48 (FIG. 6). The output of the read circuit 22 is loaded in the memory 16A or 16B by way of the bus 34. The data of the memories 16A and 16B can be sent to a high-rank unit such as ODC through the selector 20 and the ODC interface 11. A reference numeral 24 denotes a CRC (Cyclic Redundancy Check) error detection circuit for detecting that the read circuit 22 has performed the error correcting operation erroneously on the error which is beyond the error correcting capability of the read circuit 22. The error detection signal 240 produced by the circuit 24 is supplied to the input of the microprocessor 12 together with the status signals of other circuit components through a multiplexer 15.

In the system described above, the write-in data (i.e. data to be written on the optical disk) supplied from the CPU 1 to the OSC 4 through the ODC 3 on a sector basis is first placed in the buffer memory 16A or 16B. More specifically, the data of one sector of 512 bytes is segmented in such a manner that the data of the first to 385th bytes are divided by 35, while the data of the 386th to 512th bytes is divided by 34, to be thereby segmentated into 15 code words in total which are numbered 0 to 14, respectively. When this data is to be transferred to the write circuit 21 from the memory 16A or 16B through the buses 33A or 33B, the data is read out from a matrix having rows constituted, respectively, by the code words (refer to FIG. 7) in the direction columnwise sequentially from the zeroth column (1st, 36th, 71th, . . . 488th bytes) to the 34th column (35th, 70th, . . . 385th bytes). In other words, the data supplied from the CPU in the order of the code words are rearrayed in the order of the columns (hereinafter a set of data corresponding to 15 bytes of one column is referred to as a section) to be subsequently recorded on the optical disk in an interleaved manner.

Figure 3:
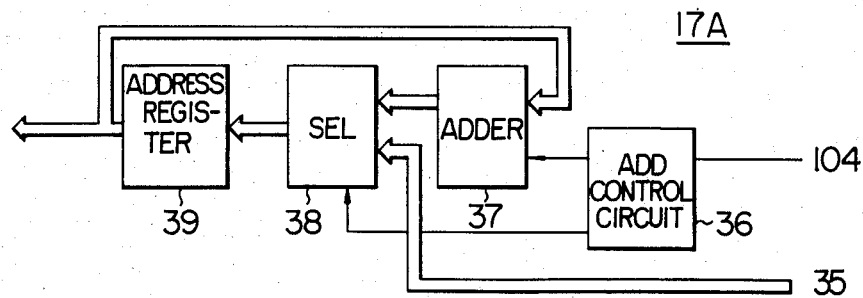
FIG. 3 shows in a block diagram an arrangement of an address controller (17A) which constitutes a part of the OSC shown in FIG. 2.

FIG. 3 shows a circuit configuration of the address controller 17A which is designed to perform address control for sequentially writing the data supplied from CPU 1 through the bus 32 into the memory 16A and for reading the data therefrom onto the bus 33A in the interleave mode. In the figure, a reference numeral 36 denotes an addition control circuit which responds to the control signal 104 supplied from the microprocessor 12 for causing an adder circuit 37 to operate in a sequential mode (i.e. plus "1"-incrementing mode) or alternatively in the interleave mode i.e. mode of incrementing by plus(+) 35 or 34, a numeral 38 denotes a selector for selecting either the output of the adder circuit 37 or the address outputted from the microprocessor 12 supplied to the selector 28 by way of the address bus 35, and a reference numeral 39 denotes an address register for latching the output of the selector 38, the output of the address register 39 being inputted to the adder circuit 37. Upon reading or writing of the data placed in the buffer memory 16A, the microprocessor 12 outputs the leading address of the memory 16A onto the memory bus 35 and supplies the control signal 104 indicative of the operation mode to the addition control circuit 36. The leading address is placed in the register 39 to constitute the first memory address. The adder circuit adds "1" to the value contained in the register 39 in the sequential mode, but adds "35" or "34" to the content of the register 39 in the interleave mode, the value thus updated being loaded in the register 39 by way of the selector 38 to constitute the next memory address. It should be understood that the memory control circuit 17B which designates the memory address of the other buffer memory 16B is constituted in a manner similar to the memory control circuit 17B described above.

Figure 4:
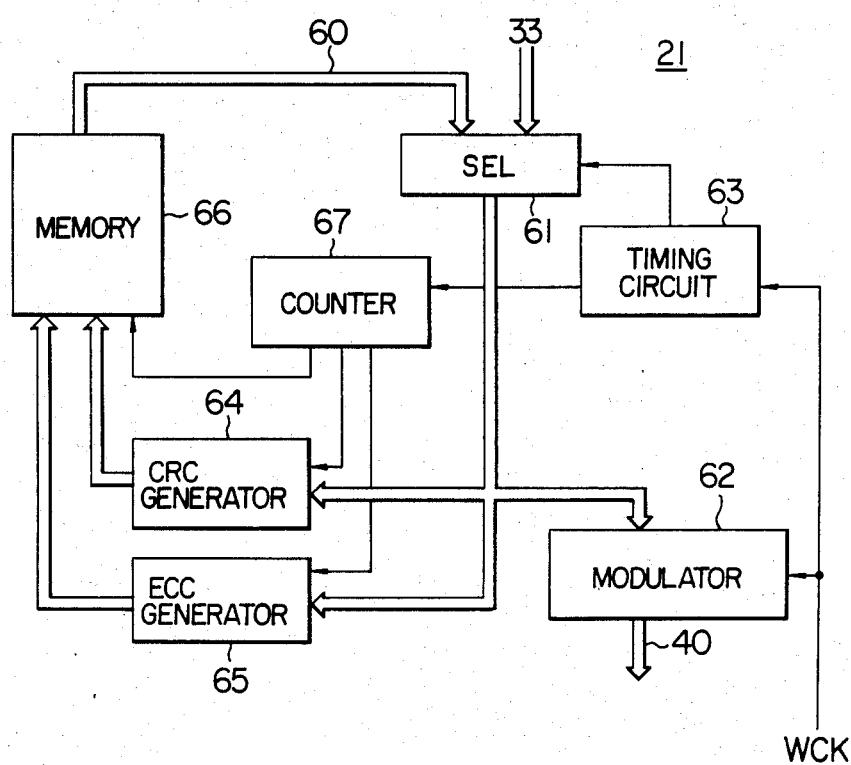
FIG. 4 shows in a block diagram an arrangement of a main part of a write circuit (21) shown in FIG. 2.
Figure 7:
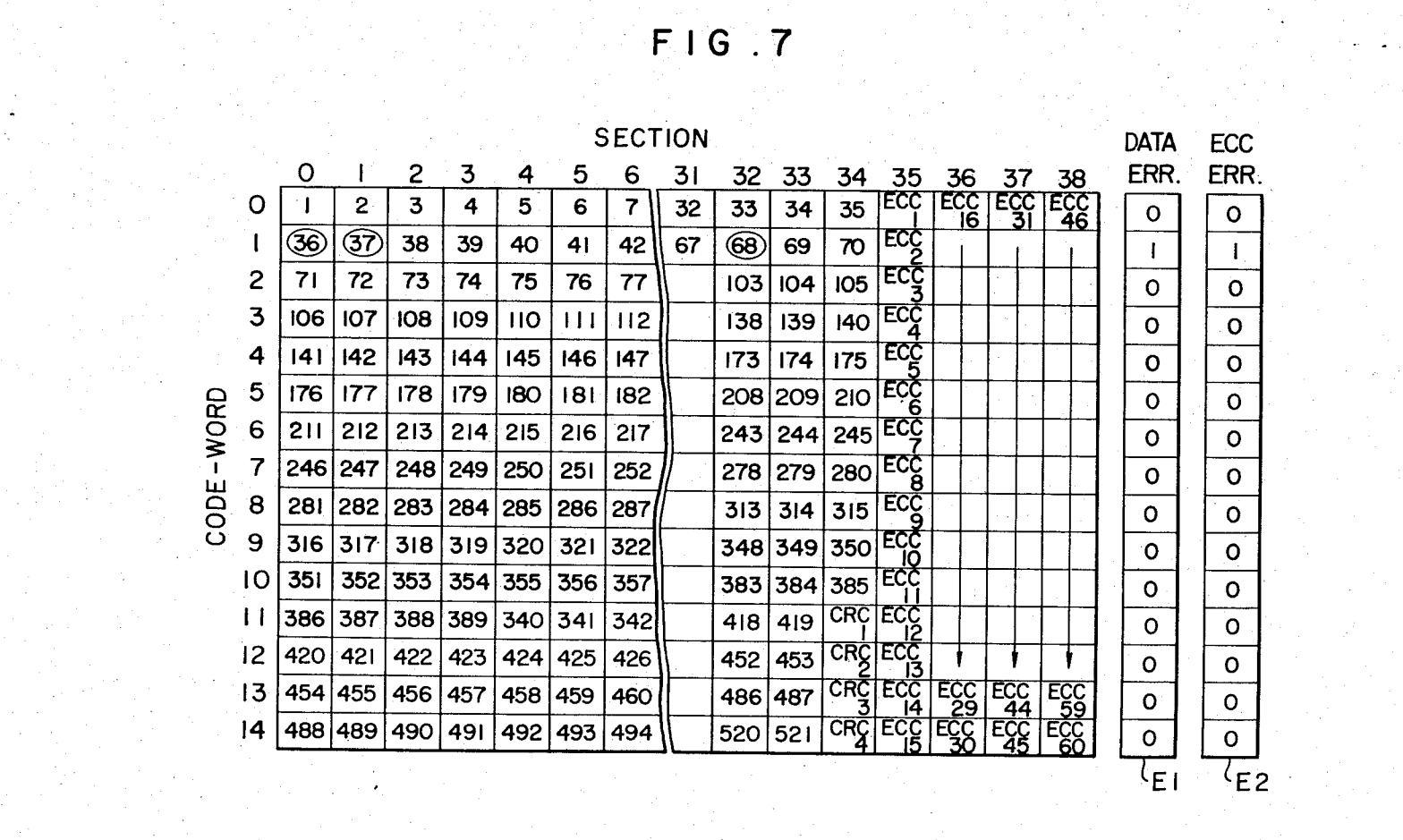

FIG. 4 shows in a block diagram a circuit arrangement of a main portion of the write circuit 21 which performs the modulating operation for writing the data read out from the buffer memory 16A or 16B onto the optical disk and the code adding operation to add the error correcting code or ECC and the cyclic redundancy check code or CRC code for correcting errors upon data reproduction. This write circuit 21 comprises a selector 61 for selecting either the write-in data 33 outputted from the selector 19 or the output data 60 from a memory 66 which will be mentioned below, a modulator circuit 62 for modulating the output of the selector 61 and supplying the modulated output to the ODU interface 23, a CRC generator 64 for performing arithmetic operation on the output data from the selector 61 to create the CRC code, an ECC generator 65 for performing arithmetic operation on the output data from the selector 61 to create the ECC, the memory 66 for storing temporarily the CRC and ECC code, and a timing circuit 63 for preparing a select signal for the selector 61 and a count signal for a counter 67 from a write clock signal WCK supplied from the ODU 5 to the modulator circuit 62, wherein the operation timing signal for the CRC code generator 64 and the ECC generator 65 as well as the address of the memory 66 are supplied from the counter 67. The ECC generator 65 creates the ECC for each code word of the one sector data of 521 bytes inputted in the order of the sections. The ECC for the single code word has a length of 32 bits (4 bytes). Upon completion of the ECC creating arithmetic operation on all the data of single sector of 521 bytes and CRC of 4 bytes, the ECCs of the individual code words stored in the memory 66 are read out in the order of the sections in the manner similar to the interleaving of data, as is illustrated in FIG. 7 for the 35th to 38th columns, to be subsequently supplied to the ODU 5 through the selector 61 and the modulator circuit 62. The ECC of 4 bytes has a capability of correcting any given error of two bytes for each single code word. In the case of the illustrated embodiment in which the single sector consists of 15 code words, an error up to 30 bytes at maximum for one sector produced on the optical disk can be corrected with the aid of the ECC upon reproduction. On the other hand, the CRC code is prepared for the purpose of determining whether the data error of which correction is beyond the correcting capability of the read circuit 22 using the ECC is erroneously corrected by the read circuit 22 (which will be described in detail hereinafter) upon reproduction of data. The cyclic redundancy check or CRC code consists of 4 bytes and is recorded on the optical disk at the last sections which follow the data in the 34th section, as indicated in FIG. 7 by CRC 1 to CRC 4. In the data reproduction, the CRC code detector 24 performs the error detection by making use of the CRC code (i.e. CRC1, CRC2, . . . CRC4) in succession to the data correction by using the ECC in the read circuit 22. In case the error is detected with the CRC code, a signal 240 is outputted, which indicates that the code word which has undergone error correction with the aid of the ECC code still suffers error resulting from the error correction itself, whereby the relevant data is excluded from utilization. In this way, only those code words that are not subjected to the error correction with the ECC (i.e. the code words suffering no error) are allowed to be utilized as the effective or valid data.

The positional relationship of the data of the individual sectors in the data write-in process elucidated above are illustrated in FIGS. 5A through 5C. More specifically, FIG. 5A shows the data of one sector supplied to the input of the OSC 4 from the CPU 1 through the channel 2 and the ODC 3, which data is written in the buffer memory 16A or 16B in the sequence of the first byte, the second byte, . . . , and the 521th byte. FIG. 5B illustrates the sequence of data read out from the aforementioned buffer memory in the interleave mode and supplied to the write circuit 21. As will be seen from comparison with FIG. 7, the data is read out in the order of the sections. FIG. 5C shows the output data 40 of the write circuit 21. It will be seen that the CRC code and the ECC follow the data section. The optical drive unit or ODU 5 writes the data (FIG. 5C) supplied from the optical disk string switch controller or OSC 4 on the optical disk without any modification.

In the data reproducing operation, the data sent from the optical drive unit or ODU 5 in the order or sequence illustrated in FIG. 5C is processed by the read circuit 22 incorporated in the OSC 4, whereby the data which has undergone the error correction illustrated in FIG. 5B is written in the buffer memory 16A or 16B in the interleave mode. The data read out sequentially from the buffer memory 16A or 16B can be transferred to the CPU 1 in the sequence illustrated in FIG. 5A.

FIG. 6 is a view showing an arrangement of the read circuit 22. The signal 36 picked up from the optical disk is supplied to the input of a variable frequency oscillator or VFO circuit 47 through the output signal line 50 of the ODU interface 23. The VFO circuit 47 produces the data signal 51 and additionally a read clock signal 55 synchronized with the input signal. The data signal 51 is demodulated through a demodulation circuit 46; wherein the demodulated data 52 is sequentially supplied to a block memory 43A or 43B through a selector 44A or 44B in synchronism with the read clock 55. At that time, the demodulated data 52 is also supplied to an ECC syndrome creating circuit 45A or 45B which operates in synchronism with the read clock 55. In this connection, the reason why two pairs of the block memories and the ECC syndrome creating circuits are, respectively, provided is that in parallel to the operation for creating the ECC syndrome by storing the demodulated data in one of the block memories, the data of the preceding sector already stored in the other block memory is allowed to be read out to perform the ECC correcting operation on that data. The output of the block memory 43A or 43B can be selectively sent out on the output bus 34 through the selector 41 or supplied to the ECC correction circuit 48 through the selector 42. The ECC correction circuit 48 has the input supplied with the syndrome information outputted from the ECC syndrome creating circuit 45A or 45B through a selector 49. On the other hand, the output 57 of the ECC correction circuit 48 can be supplied to either the block memory 43A or 43B through the selector 44A or 44B, respectively. The selection of the inputs performed by the selectors 41; 42 and 44A; 44B as well as selection of the ECC syndrome creating circuit 45A or 45B to be operated is determined by a control signal 108A issued from the microprocessor 12.

It is now assumed, by way of example, that the demodulated data of the Nth sector on the optical disk has already been stored in the block memory 43A with the syndrome of the Nth block having been created in the circuit 45A and that the data of (N+1)th sector is now being demodulated by the demodulation circuit 46. In this cycle or phase, the inputs B of the individual selectors (shown in FIG. 6) are selected so that the ECC syndrome creating circuit 45B operates to create the ECC syndrome for the demodulated data 52 under the command of the control signal 108A. In the course of the demodulated data 52 being written in the block memory 43B, the data of the Nth sector placed in the block memory 43A and the ECC syndrome already created for each code word of the Nth sector by the ECC syndrome creating circuit 45A are fetched by the ECC correction circuit 48, which in turn re-arrays the data of the Nth sector inputted in the order of the sections to thereby perform the data correction on the code-word basis by making use of the ECC syndrome. This correcting operation is activated in response to a control signal 108B issued by the microprocessor 12. The data 57 of the Nth sector which has undergone the processing of the ECC correction circuit 48 is written in the block memory 43A through the selector 44A and subsequently outputted onto the output bus 34 through the selector 44A to be loaded in the buffer memory 16A or 16B under the command of the microprocessor 12. The data of the (N+1)th sector stored in the block memory 43B is read in the ECC correction circuit 48 for the error correction during the succeeding cycle in which the data of the (N+2)th sector is demodulated. In this connection, it should be mentioned that the fetching of data by the ECC correction circuit and the operation for writing the corrected data in the buffer memory 43A or 43B are performed in synchronism with an internal clock signal 56 which has a shorter period than the read clock 55.

As will be appreciated from the above description, by virtue of the arrangement in which the block memories 43A and 43B and the ECC syndrome creating circuits 45A and 45B are provided in pairs, respectively, the demodulated data of the plural successive sectors can be corrected by using the error correcting code or ECC with an improved efficiency.

It is again assumed, by way of example, that among the demodulated data, that data 36, 37 and 68 of the first code word which is designated by encircling them with a circle in FIG. 7 have proven to suffer from error as demonstrated by the ECC syndrome. In that case, when the error correcting capability of the ECC correction circuit 48 is not greater than two bytes for each code word, the error of the second code word enumerated above can no longer be corrected. Under the circumstance, the ECC correction circuit memorizes the presence or absence of the data error for every code word as well as the presence or absence of the uncorrectable error in the manners illustrated in tables E1 and E2 shown in FIG. 7 and informs the error situation to the microprocessor 12, which in turn indicates the presence of the uncorrectable error at the particular word of a block upon transfer of data of that block to the high ranked ODC 3 from the buffer memory 16A or 16B. In the case of the illustrated example, the ODC 3 invalidates the data of the first code word constituted by the 36th byte to the 70th byte, while the ODC 3 deals with the remaining data constituted by the first to 35th bytes and the 71th to 521th bytes as the valid data. In this connection, it should be noted that in case the CRC code detection circuit 24 detects an error, all the code words which have undergone the ECC correction are rendered invalid.

When data errors are produced at random on the optical disk, the data errors will be produced at corresponding locations of the data correcting matrix shown in FIG. 7. So far as the error as occurs covers no more than two bytes in each code word, the relevant data can be corrected with the aid of the ECC. For example, it is assumed that all the data (1, 36, ..., 488; 2, 37, ..., 455 and 489) which belongs to the first and second sections shown in FIG. 7 suffer from error. In that case, however, the data error includes no more than two bytes for each of the code words. Accordingly, all the data can be corrected by the ECC correction circuit.

In the foregoing, description has been made on the assumption that the data error is informed to the microprocessor 12 by the ECC correction circuit 48 on the code word basis. In addition, the ECC correction circuit 48 may send to the microprocessor 12 and hence to the ODC 3 such information that the correction of data has been found unnecessary as a result of the correcting operation performed on the code word basis, to thereby allow the ODC 3 to determine the status of the data written or read on or from the optical disk. Further, although the description of the exemplary embodiment has been made on the assumption that the data correcting capability of the ECC correction circuit 48 is limited up to two data errors in each code, it will be readily be appreciated that the data error detection capability of the ECC correction circuit 48 in the data reading mode can be varied under the command of the microprocessor 12 in such a manner in which only one data error in the single code word can be corrected or any error in the single code word can not be corrected.

What is claimed is:

1. A data recording and reproducing system for recording digital data representing visual images supplied from a higher ranked unit on a recording medium on a block basis and for transferring the digital data read from said recording medium to the higher ranked unit on a block basis, comprising:
    first means for dividing each of the data blocks received from said higher ranked unit into a plurality of code words, each code word consisting of a plurality of data bytes;
    second means for adding to each code word at least one byte representing an error detecting and correcting code for that code word;
    third means connected to said second means for generating a respective cyclic redundancy check code for the data bytes of each respective data block and for including said cyclic redundancy check code in at least a given one of said code words of the data block;

fourth means connected to receive the output of said third means for recording said data blocks including said error correcting code and said cyclic redundancy check code therein on said recording medium and for reproducing data recorded on said recording medium;

fifth means connected to receive the data of each of said data blocks read out from said recording medium by said fourth means for subjecting said data to error detection and correction on a code word basis with the aid of said error detection and correction codes reproduced therewith and for sending information indicative of the presence or absence of a data error in each code word to said higher ranked unit together with the corrected data of each block; and sixth means responsive to said cyclic redundancy check code in each reproduced data block for determining whether the result of said error correction of each data block carried out with the aid of said error correction codes is correct or erroneous and for generating an error signal when said error correction is found to be erroneous.

2. A data recording and reproducing system according to claim 1, wherein said error signal and a signal identifying the code word subjected to said error correction effected with the aid of said error correction code is supplied to the higher ranked unit so that in the case of erroneous correction, only the data of the code word of the relevant data block which has undergone the error correction is treated as being invalid in said higher ranked unit.

3. A data recording and reproducing system according to claim 2, further including means for interleaving the data of each code word, the cyclic redundancy check code and the error correction code before the data block is recorded.

4. A data recording and reproducing system according to claim 1, further including means for interleaving the data of each code word, the cyclic redundancy check code and the error correction code before the data block is recorded.

* * * * *